United States Patent
Jones et al.

(10) Patent No.: US 6,697,745 B2
(45) Date of Patent: Feb. 24, 2004

(54) TECHNIQUE AND APPARATUS TO CONTROL THE TRANSIENT RESPONSE OF A FUEL CELL SYSTEM

(75) Inventors: Daniel O. Jones, Glenville, NY (US); John Parks, Loudonville, NY (US); Dustan Skidmore, Troy, NY (US)

(73) Assignee: Plug Power Inc., Latham, NY (US)

( * ) Notice: Subject to any disclaimer, the term of this patent is extended or adjusted under 35 U.S.C. 154(b) by 152 days.

(21) Appl. No.: 09/749,261

(22) Filed: Dec. 27, 2000

(65) Prior Publication Data

US 2002/0082784 A1 Jun. 27, 2002

(51) Int. Cl.[7] .............................................. G06F 19/00
(52) U.S. Cl. ....................................................... 702/60
(58) Field of Search ........................... 702/60; 705/412; 307/130; 701/22; 320/110; 364/494; 429/19

(56) References Cited

U.S. PATENT DOCUMENTS

| | | | |
|---|---|---|---|
| 5,432,710 A | * 7/1995 | Ishimaru et al. | 705/412 |
| 5,804,894 A | * 9/1998 | Leeson et al. | 307/130 |
| 5,991,670 A | * 11/1999 | Mufford et al. | 701/22 |
| 6,461,751 B1 | * 10/2002 | Boehm et al. | 429/13 |

* cited by examiner

*Primary Examiner*—Michael Nghiem
*Assistant Examiner*—Tung S Lau
(74) *Attorney, Agent, or Firm*—Trop, Pruner & Hu, P.C.

(57) ABSTRACT

A technique that is usable with a fuel cell stack includes coupling the fuel cell stack to a load, monitoring a power that is consumed by the load and determining if the power is increasing or decreasing. If the output power is increasing, a first control technique is used to control a fuel flow to the fuel cell stack, and if the output power is decreasing, a second control technique that is different from the first control technique is used to control the fuel flow to the stack.

28 Claims, 9 Drawing Sheets

TECHNIQUE AND APPARATUS TO CONTROL THE TRANSIENT RESPONSE OF A FUEL CELL SYSTEM

BACKGROUND

The invention generally relates to a technique and apparatus to control the transient response of a fuel cell system.

A fuel cell is an electrochemical device that converts chemical energy produced by a reaction directly into electrical energy. For example, one type of fuel cell includes a polymer electrolyte membrane (PEM), often called a proton exchange membrane, that permits only protons to pass between an anode and a cathode of the fuel cell. At the anode, diatomic hydrogen (a fuel) is reacted to produce hydrogen protons that pass through the PEM. The electrons produced by this reaction travel through circuitry that is external to the fuel cell to form an electrical current. At the cathode, oxygen is reduced and reacts with the hydrogen protons to form water. The anodic and cathodic reactions are described by the following equations:

$H_2 \rightarrow 2H^+ + 2e^-$ at the anode of the cell, and $O_2 + 4H^+ + 4e^- \rightarrow 2H_2O$ at the cathode of the cell.

A typical fuel cell has a terminal voltage near one volt DC. For purposes of producing much larger voltages, several fuel cells may be assembled together to form an arrangement called a fuel cell stack, an arrangement in which the fuel cells are electrically coupled together in series to form a larger DC voltage (a voltage near 100 volts DC, for example) and to provide more power.

The fuel cell stack may include flow plates (graphite composite or metal plates, as examples) that are stacked one on top of the other, and each plate may be associated with more than one fuel cell of the stack. The plates may include various surface flow channels and orifices to, as examples, route the reactants and products through the fuel cell stack. Several PEMs (each one being associated with a particular fuel cell) may be dispersed throughout the stack between the anodes and cathodes of the different fuel cells. Electrically conductive gas diffusion layers (GDLs) may be located on each side of each PEM to form the anode and cathodes of each fuel cell. In this manner, reactant gases from each side of the PEM may leave the flow channels and diffuse through the GDLs to reach the PEM.

A fuel cell system may include a fuel processor that converts a hydrocarbon (natural gas or propane, as examples) into a fuel flow for the fuel cell stack. For a given output power of the fuel cell stack, the fuel flow to the stack must satisfy the appropriate stoichiometric ratios governed by the equations listed above. Thus, a controller of the fuel cell system may determine the appropriate power that the stack needs to supply, and based on this determination, the controller estimates the fuel flow to satisfy the appropriate stoichiometric ratios to produce this power. In this manner, the controller regulates the fuel processor to produce this flow, and in response to the controller determining that a change in the output power is needed, the controller estimates a new rate of fuel flow and controls the fuel processor accordingly.

The fuel cell system may provide power to a load, such as a load that is formed from residential appliances and electrical devices that may be selectively turned on and off to vary the power that is demanded by the load. Thus, the power that is consumed by the load may not be constant, but rather the power may vary over time and abruptly change in steps. For example, if the fuel cell system provides power to a house, different appliances/electrical devices of the house may be turned on and off at different times to cause the power that is consumed by the load to vary in a stepwise fashion over time.

It is possible that the fuel processor may not be able to adequately adjust its fuel flow output in a timely fashion to respond to a transient in the power that is consumed by the load. In this manner, the rate at which the power that is consumed by the load changes during a transient may be significantly faster than the rate at which the fuel processor can change its fuel output. For example, the time constant of the fuel processor may be in the order of minutes, and the time constant at which the power that is consumed by the load changes during a transient may be in the order of seconds. Due to this discrepancy, it is possible that the output of the fuel processor may significantly lag transients in the power that is consumed by the load, thereby resulting in inefficient operation of the fuel cell system.

For example, if the fuel cell system powers a house, one or more appliances may be briefly turned on to momentarily increase the power that is consumed by the appliance(s) to produce a transient. However, by the time the fuel processor responds to counteract this increase, the one or more appliances that were turned on may have been turned off. During the time during which the fuel processor falls behind, it is possible that power from a power grid may provide the power (to the load) that the fuel cell system fails to provide. However, this arrangement may contribute to increased costs associated with powering the load.

Thus, there is a continuing need for an arrangement and/or technique to address one or more of the problems that are stated above.

SUMMARY

In an embodiment of the invention, a technique that is usable with a fuel cell stack includes coupling the fuel cell stack to a load, monitoring a power that is consumed by the load and determining if the power is increasing or decreasing. If the output power is increasing, a first control technique is used to control a fuel flow to the fuel cell stack, and if the output power is decreasing, a second control technique that is different from the first control technique is used to control the fuel flow to the stack.

Advantages and other features of the invention will become apparent from the following description, from the drawing and from the claims.

DETAILED DESCRIPTION

Figure 1:
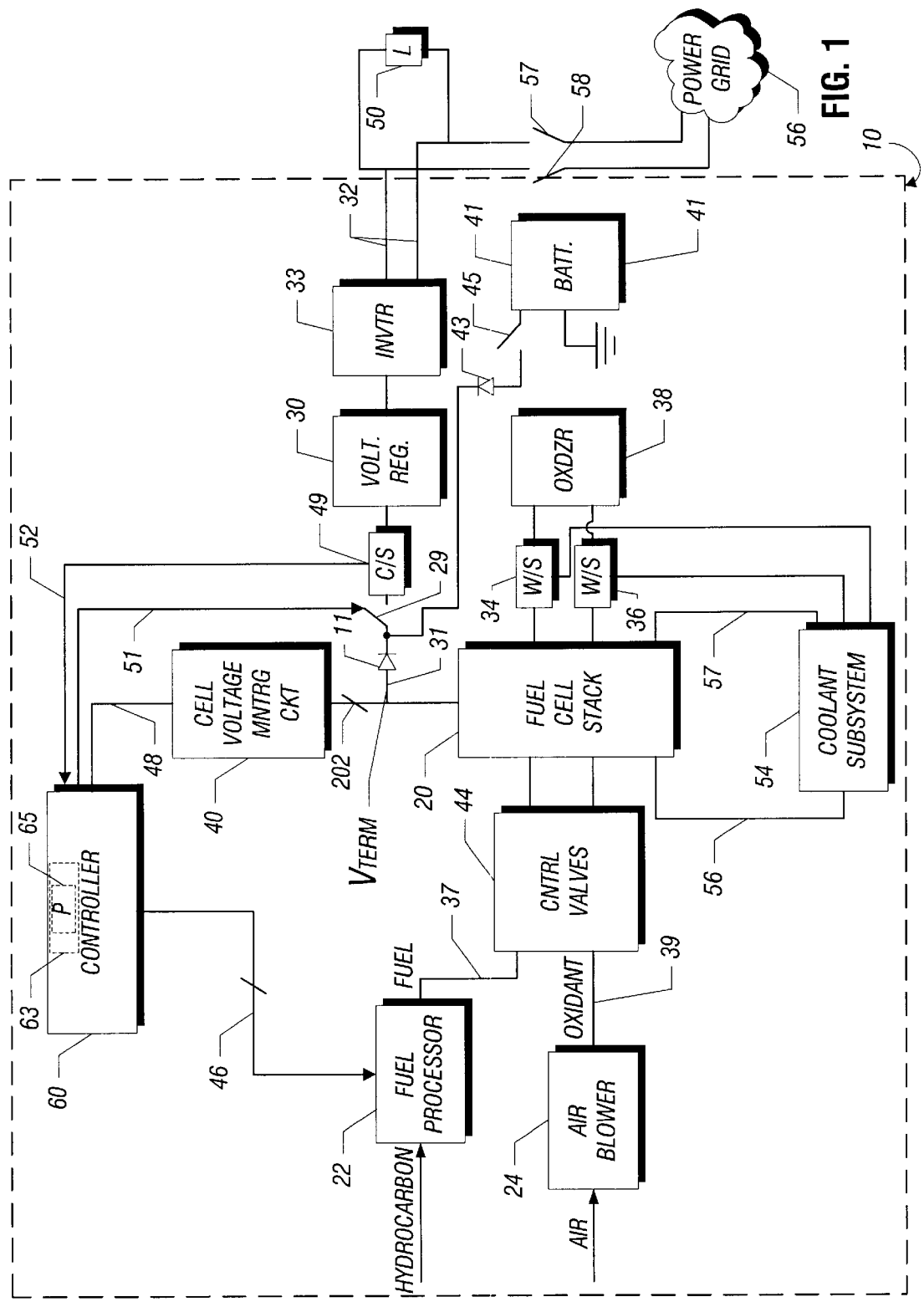
FIG. 1 is a schematic of a fuel cell system according to an embodiment of the invention.

Referring to FIG. 1, an embodiment of a fuel cell system 10 in accordance with the invention includes a fuel cell stack 20 that is capable of producing power for a load 50 (a residential load, for example) in response to fuel and oxidant flows that are provided by a fuel processor 22 and an air blower 24, respectively. In this manner, the fuel cell system 10 controls the fuel production of the fuel processor 22 to control the fuel flow that the processor 22 provides to the fuel cell stack 20. This rate of fuel flow to the fuel cell stack 20, in turn, controls the level of power that is produced by the stack 20. As described below, the fuel cell system 10 bases (at least in part) its regulation of the fuel processor 22 on the power that is consumed (or "demanded") by the load 50.

The power that is consumed by the load 50 varies with time, as the load 50 represents a collection of individual loads (appliances and/or electrical devices that are associated with a house, for example) that may each be turned on and off. As a result, the power that is consumed by the load 50 may change to produce a transient. In the context of this application, a "transient in the power consumed by the load 50" refers to a significant change in the power (in the power that is consumed by the load 50) that deviates from the current steady state level of the power at the time the transient occurs. The transient may have a time constant that is on the same order or less than the time constant of the fuel processor 22.

Therefore, the fuel processor 22 may not be able to quickly adjust to transients in the power that is consumed by the load 50. However, as described below, the fuel cell system 10 takes measures to prevent the fuel processor 22 from prematurely responding to the transients until the system 10 verifies that the change in power is sustained and thus, is not temporary in nature.

In the context of the application, the phrase "up transient" refers to a positive transient in the power that is consumed by the load 50, and the phrase "down transient" refers to a negative transient in the power that is consumed by the load 50. An up or down transient may or may not result in a sustained change in the power that is consumed by the load 50. As described below, the fuel cell system's response to up transients may differ from the system's response to down transients, in some embodiments of the invention.

The effect of up and down transients on the fuel cell system 10 may differ, depending on the power connection mode of the system 10. In this manner, in a first power connection mode, the fuel cell system 10 is connected to furnish power to the load 50 in parallel with a power grid 56. Therefore, if the fuel cell system 10 is not capable of supplying all of the power that is consumed by the load 50, the power grid 56 may supplement the system's output power. This arrangement may be cost ineffective. Therefore, it may be desirable for the fuel processor 22 to increase its output when the load 50 needs more power. However, the increase in power that is consumed by the load 50 may be short in nature, and as a result, it is possible that by the time the fuel processor 22 increases its fuel output, the power that is consumed by the load 50 has returned to the level that existed before the up transient. Thus, the fuel processor 22 may be producing too much fuel that does not match the power that is being consumed by the load 50.

In some embodiments of the invention, when the power that is consumed by the load 50 is not changing, the fuel processor 22 provides a flow rate that establishes a predetermined percentage of the load's power, and the remaining percentage is provided by the power grid 56. In this manner, for these embodiments, both the fuel cell system 10 and the power grid 56 provide power to the load 50. For example, in some embodiments of the invention, during steady state operation, the fuel cell system 10 may provide ninety-five percent of the power that is consumed by the load 50, and the power grid 56 may provide the remaining five percent of the power. It is noted that when up or down transients occur, the fuel cell system 10 may provide power that deviates from the predetermined percentage until the fuel cell system 10 changes its power output in accordance with the techniques described herein.

In a second power connection mode, the fuel cell system 10 may be disconnected from the power grid 56 and include a battery 41 as a source of instant supplemental power for purposes of providing time to allow the fuel processor 22 to increase its output. Therefore, if the fuel cell stack 20 cannot provide adequate power for the load 50 in response to an up transient, the battery 41 may provide the additional power. However, the increase in power that is consumed by the load 50 may be short in nature, and as a result, it is possible that the by the time the fuel processor 22 increases its fuel output, the power that is demanded by the load 50 has returned to the level that existed before the up transient. It is noted that if the increase in power that is consumed by the load 50 is sustained, the fuel cell system 10 eventually responds to boost its power output to prevent depletion of the finite amount of energy that is stored in the battery 41.

Figure 2:
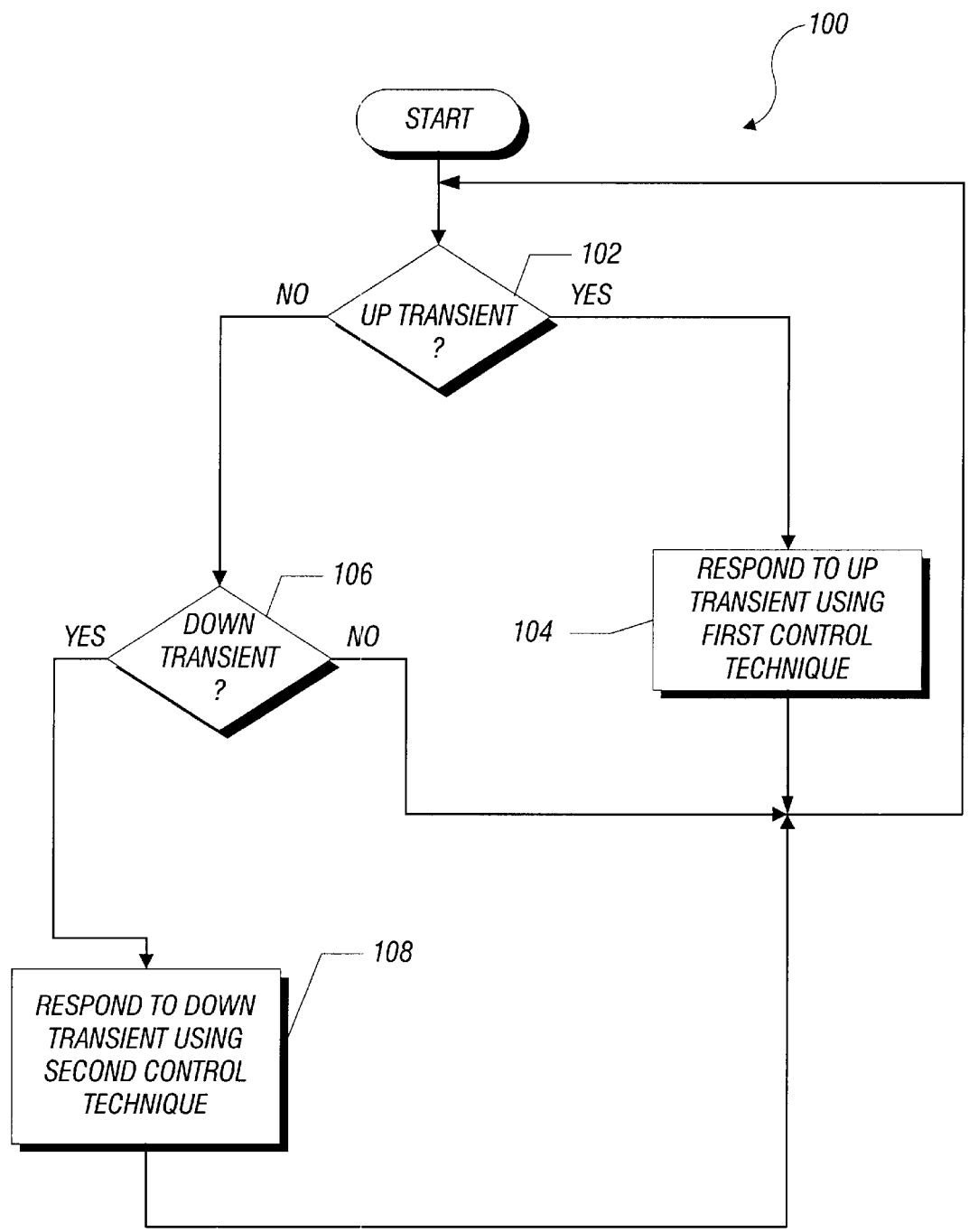
FIGS. 2, 5, 6, 7, 8, 9 and 10 are flow diagrams depicting operation of the fuel cell system according to different embodiments of the invention.

Referring also to FIG. 2, to prevent the fuel processor 22 from prematurely responding to up and down transients, in some embodiments of the invention, the system 10 uses a technique 100 to regulate the fuel production of the fuel processor 22 so that the fuel processor 22 only responds to sustained increases and decreases in the power that is consumed by the load 50. In the technique 100, the fuel cell system 10 determines (diamond 102) whether an up transient has occurred. If so, the fuel cell system 10 responds (block 104) to the up transient using a first control technique (described below), as indicated in block 104. However, if the output power has not increased, the fuel cell system 10 then determines (diamond 106) whether a down transient has occurred. If so, then the fuel cell system 10 responds to the down transient using a different, second control technique (described below). Thus, the fuel cell system 10 may use two different control techniques to control the fuel processor 22: a first control technique for up transients and a second different control technique for down transients.

The two different control techniques accommodate the scenario in which the rate at which the fuel processor 22 increases its output may be significantly slower than the rate at which the fuel processor 22 decreases its output. The two different control techniques may also accommodate the scenario in which the up transients occur at a significantly greater frequency than the down transients.

Referring to FIG. 1, in some embodiments of the invention, the fuel cell system 10 includes a controller 60 to detect the up and down transients and regulate the fuel processor 22 accordingly. More specifically, in some embodiments of the invention, the controller 60 detects these up and down transients by monitoring the cell voltages, the terminal stack voltage (called "$V_{TERM}$") and the output current of the fuel cell stack 20. From these measurements, the controller 60 may determine when an up or down transient occurs in the power that is consumed by the load 50.

To obtain the above-described measurements from the fuel cell stack 20, the fuel cell system 10 may include a cell voltage monitoring circuit 40 to measure the cell voltages of the fuel cell stack 20 and the $V_{TERM}$ stack voltage; and a current sensor 49 to measure a DC output current from the stack 20. The cell voltage monitoring circuit 40 communicates (via a serial bus 48, for example) indications of the measured cell voltages to the controller 60. The current sensor 49 is coupled in series with an output terminal 31 of the fuel cell stack 20 to provide an indication of the output current (via an electrical communication line 52). With the information from the stack 20, the controller 60 may execute a program 65 (stored in a memory 63 of the controller 60) to determine whether an up or down transient has been detected and control the fuel processor 22 accordingly via electrical communication lines 46. Specific implementations of the technique 100 (according to different embodiments of the invention) are described below.

Figure 3:
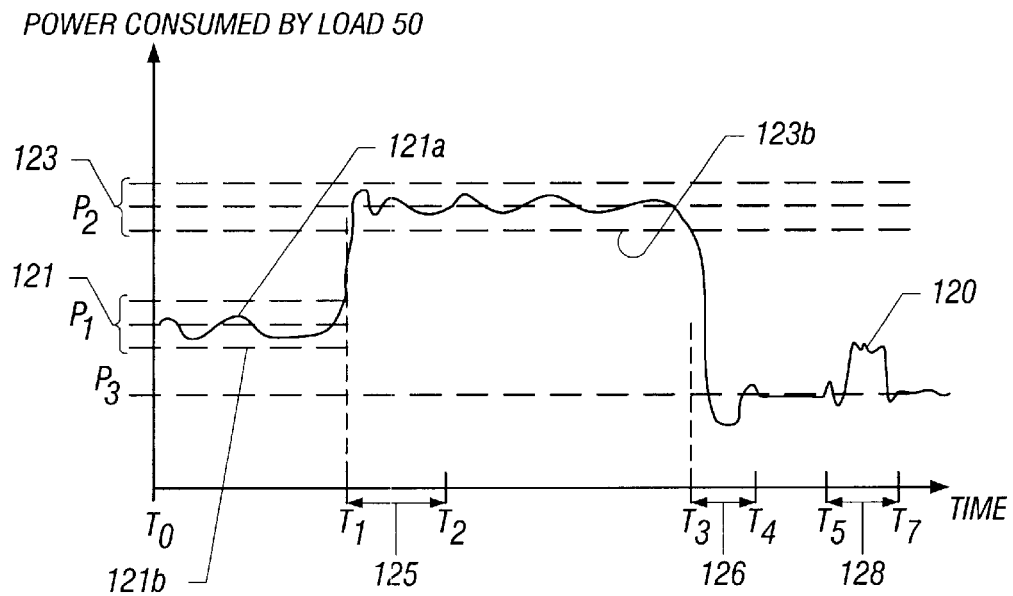
FIG. 3 depicts an exemplary waveform of a power consumed by a load of the fuel cell system over time.
Figure 4:
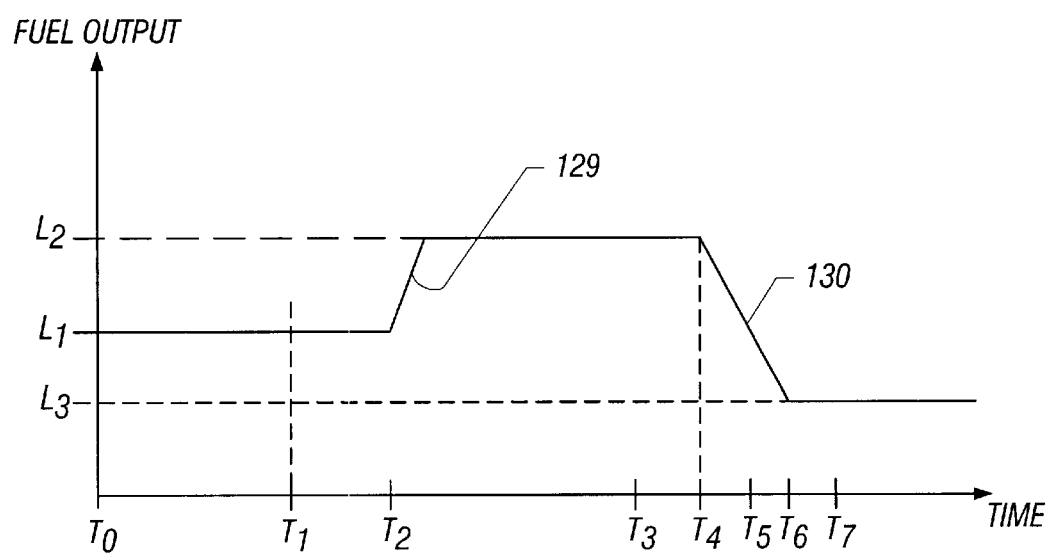
FIG. 4 depicts an output of the fuel processor in response to the power depicted in FIG. 3 according to an embodiment of the invention.
Figure 5:
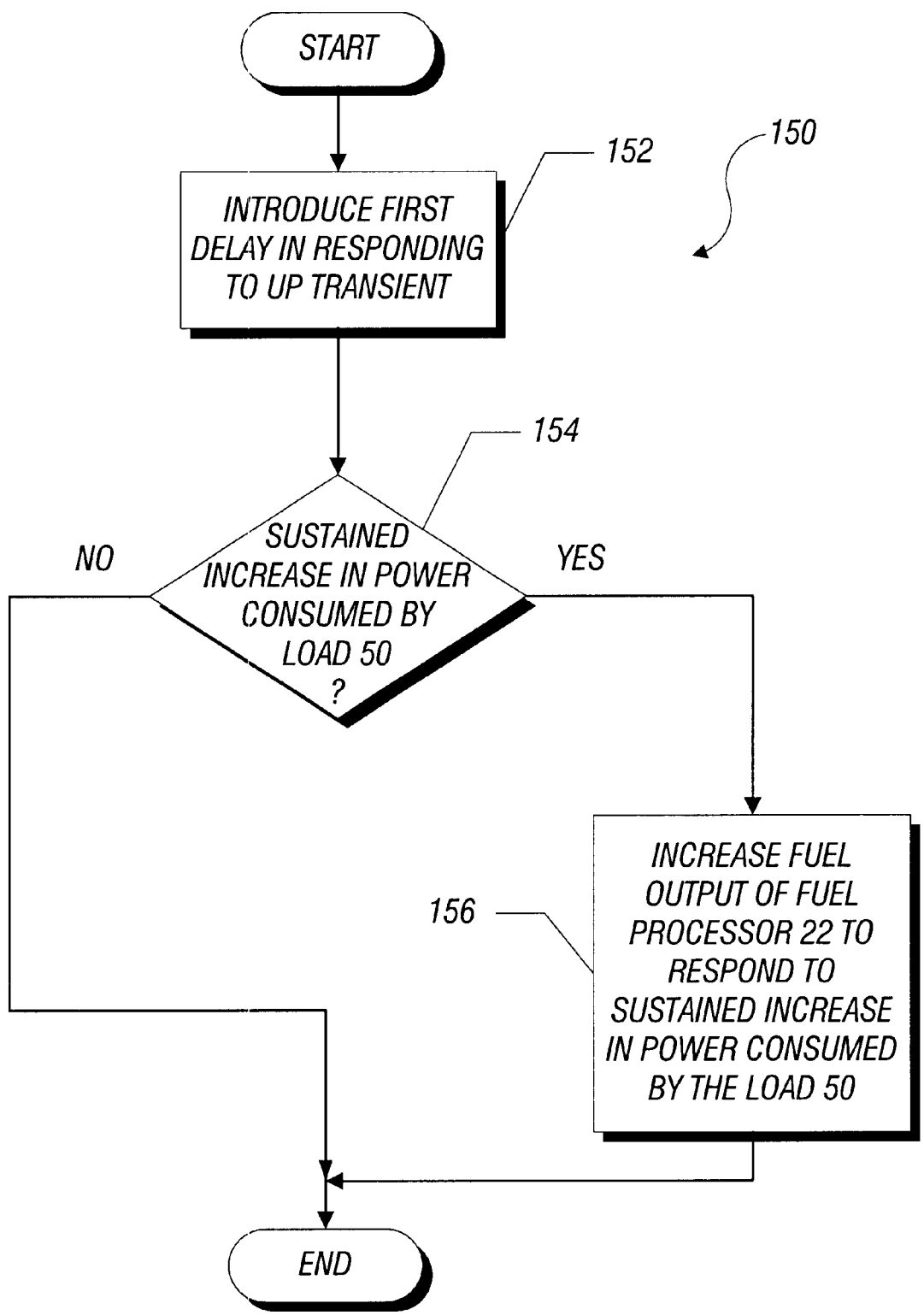

More specifically, referring to FIGS. 3 and 5, in some embodiments of the invention, the program 65, when executed by the controller 60, may cause the controller 60 to perform a technique 150 (depicted in FIG. 5) to control the fuel processor 22 in response to up and down transients. In particular, the controller 60 introduces (block 152 of FIG. 5) a first delay in response to an up transient. For example, the power that is demanded by the load 50 may initially reside near output power level called $P_1$ (see FIG. 3), and during the time interval from $T_0$ to $T_1$, the fuel processor 22 may operate at a steady state fuel output level called $L_1$ (see FIG. 4) to provide the appropriate fuel to sustain the power that is consumed by the load 50 at the $P_1$ level.

As depicted in FIG. 3, the power that is consumed by the load 50 may actually vary slightly about the $P_1$ level from time $T_0$ to time $T_1$. However, the controller 60 does not respond to slight deviations from the $P_1$ level. Instead, the controller 60 establishes a hysteresis zone 121 about the $P_1$ level by establishing upper 121a and lower 121b thresholds to set the respective upper and lower limits of the zone 121. As long as the power that is consumed by the load 50 is within the zone 121, the controller 60 determines no up or down transient has occurred. Otherwise, a variation of the power outside of the zone 121 indicates an up transient (for an increase above the upper threshold 121a) or a down transient (for a decrease below the lower threshold 121b).

As an example, as depicted in FIG. 3, at time $T_1$, the power that is consumed by the load 50 increases to a new output level $P_2$, a level that is above the upper threshold 121a and thus, is recognized by the controller 60 as being an up transient. This increase may be attributable to one or more appliances and/or devices (that are associated with a house, for example) being turned on at about the same time, for example. As noted from FIG. 3, the increase may approximate a step function.

The controller 60 does not immediately respond to this increase but rather introduces a delay, or delay interval 125, from time $T_1$ until time $T_2$, pursuant to block 152 (see FIG. 5). As described in more detail below, this delay may have a fixed or variable duration, depending on the particular embodiment of the invention.

At the expiration of the delay interval (such as the delay interval 125), the controller 60 determines (diamond 154 of FIG. 5) whether there has been a sustained increase in the power that is consumed by the load 50 during the delay interval. For the example that is depicted in FIG. 3, the power that is consumed by the load 50 during the delay interval 125 does not deviate from a hysteresis zone 123 that the controller 60 establishes about the $P_2$ level. If the output power would have decreased below the upper threshold 121a, for example, during the delay interval 125 then the controller 60 would deem this as not being a sustained increase in the power that is consumed by the load 50 and thus, would reset the delay interval without changing the output of the fuel processor 22. However, as shown, the power that is demanded by the load 50 remains with the zone 123 during the interval 125, and as a result, the controller 60 increases the fuel output of the fuel processor 22 to respond to the increase in the load 50, in accordance with block 156 of FIG. 5.

Referring to FIG. 4, thus, from time $T_0$ to $T_1$, the fuel output of the fuel processor 22 is at a constant level $L_1$, as the power that is demanded by the load 50 also remains at a nearly constant level. At time $T_1$, the fuel output of the fuel processor 22 does not change (although the power that is consumed by the load 50 has changed). At the expiration of the delay interval 125 at time $T_2$, the controller 60 controls the fuel processor 22 to ramp its fuel production upwardly until the output of the fuel processor reaches a level $L_2$, a level that sustains the $P_2$ level of power that is being consumed by the load 50.

In some embodiments of the invention, the controller 60 controls the maximum rate at which the fuel processor 22 increases its fuel production to minimize the level of carbon monoxide that may be otherwise produced by causing the fuel processor 22 to change its operating point too rapidly. In this manner, the controller 60 may establish a predefined maximum rate of increase (as indicated by the upward slope 129 in FIG. 4) that permits the fuel processor 22 to ramp upwardly without producing excessive carbon monoxide. The controller 60 may impose a similar limit on the rate of decrease in the fuel processor's output, as depicted by the constant decreasing slope 130 in FIG. 4.

Figure 6:
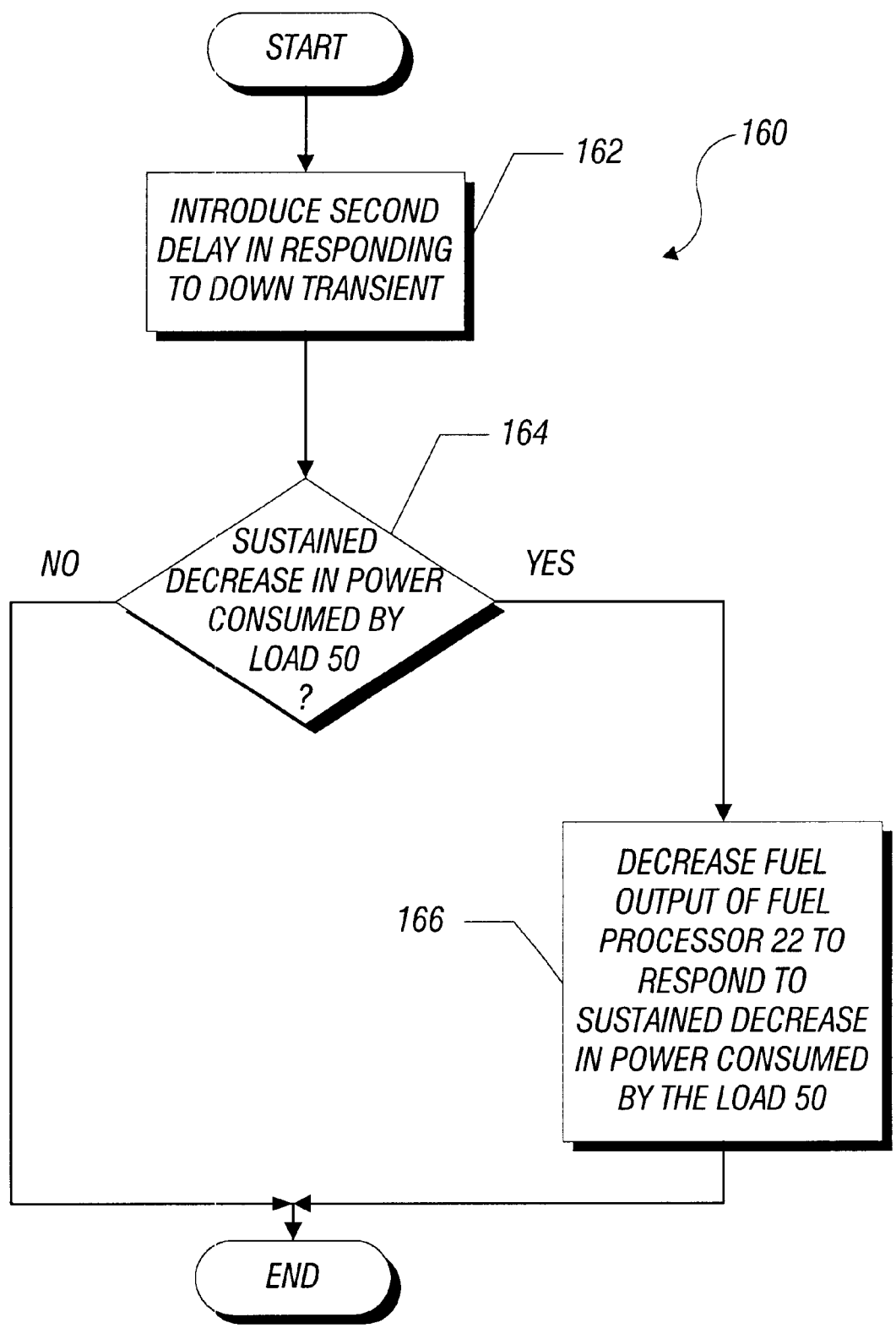

In some embodiments of the invention, the controller 60 executes the program 65 to perform a technique 160 (depicted in FIG. 6) to perform the second control technique for responding to down transients. Referring to FIGS. 3 and 6, in this manner, the controller 60 may introduce a second delay, or delay interval, (pursuant to the second control technique) when the controller 60 detects a down transient, as depicted in block 162 of FIG. 6. The controller 60 determines that a down transient has occurred when the power that is consumed by the load 50 decreases below the lower threshold of the associated hysteresis zone, as described above. If the controller 60 determines (diamond 164) that this decrease is sustained (i.e., the power that is consumed by the load 50 does not increase above the lower threshold during the delay interval), then the controller 60 decreases (block 166) the output of the fuel processor 22 to respond to the sustained decrease in power.

As an example, FIG. 3 depicts a down transient that occurs at time $T_3$. In response to this down transient, the controller 60 begins measuring a delay interval 126 that lasts from time $T_3$ until time $T_4$. Because the power that is demanded by the load 50 does not increase above the lower threshold 123b of the zone 123 during the interval 126, the controller 60 determines a sustained decrease in the power has occurred and decreases the output of the fuel processor 22 (as indicated by the ramp 130) during time $T_4$ to time $T_6$. At time $T_6$, the fuel processor 22 provides an output level $L_3$ to cause the fuel cell stack 20 to provide the appropriate level of power to the load 50.

FIG. 3 also depicts a momentary spike 120 in the power that is consumed by the load 50. The spike begins at time $T_5$ and lasts until time $T_7$. In response to the increase, the controller 60 introduces another delay interval 128 that begins at time $T_5$ and extends until time $T_7$. However, the delay interval 128 is shorter than the delay interval 125, as the controller 60 recognizes (at time $T_7$) that the increase in power has not been sustained and therefore, resets the delay and does not increase the fuel output of the fuel processor 22 to accommodate this increase.

Thus, pursuant to the technique 160, if the controller 60 determines (diamond 164) that a sustained decrease in the power that is consumed by the load 50 has existed for the duration of the second delay interval, the controller 60 decreases the fuel output of the fuel processor 22 to respond to the decrease in load, as depicted in block 166.

Figure 7:
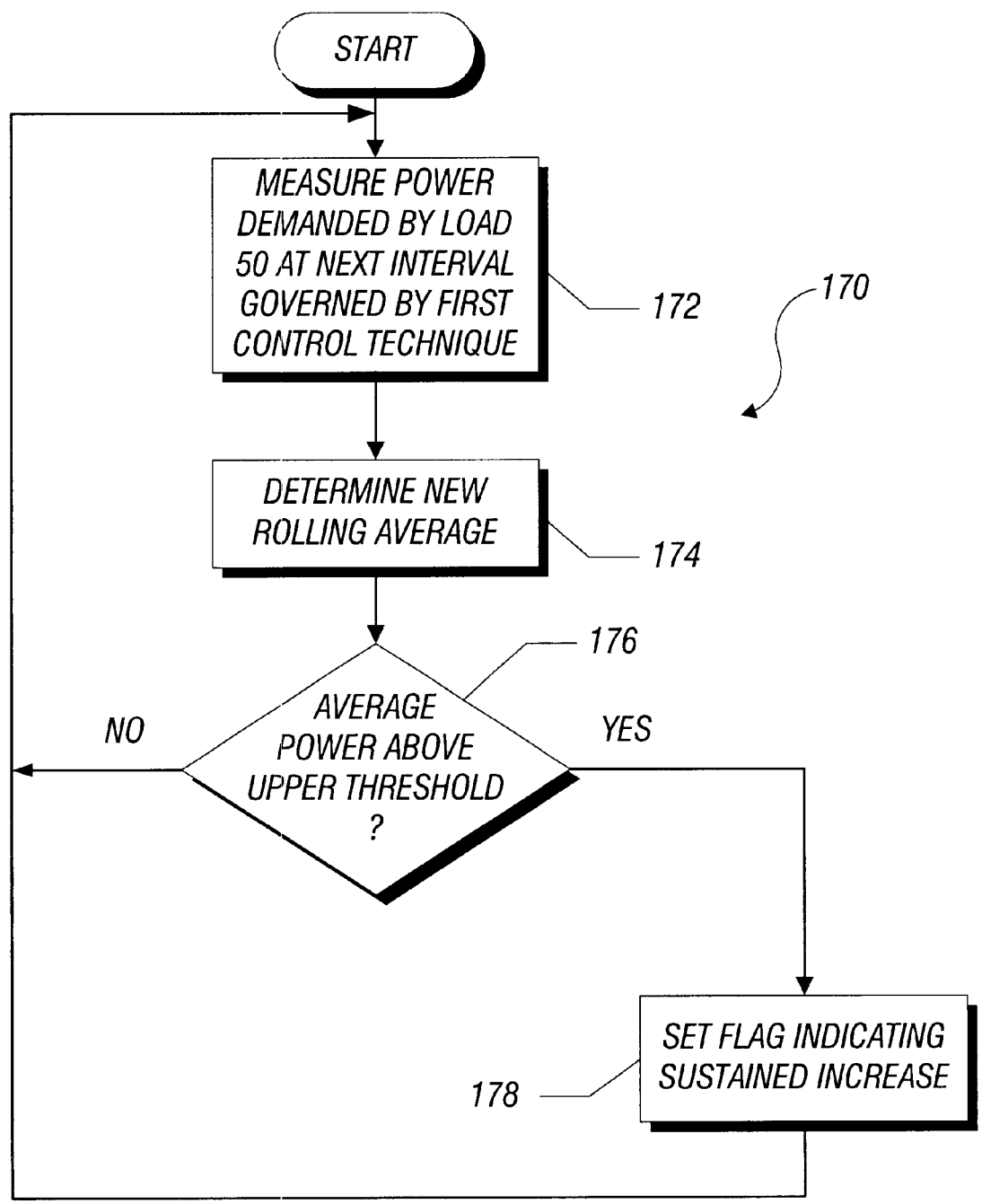

The first delay interval (associated with the first control technique) and the second delay interval (associated with the second control technique) may each have a fixed duration; may each have a variable duration; or one of the delay intervals may have a fixed duration and the other delay interval may have a variable duration, depending on the particular embodiment of the invention. As an example, FIG. 7 depicts a technique 170 that is used in connection with the first control technique and which uses a variable duration for the first delay interval. The technique 170 may be performed by the controller 60 when executing the program 65.

In the technique 170, the controller 60 measures (block 172) the power that is demanded by the load 50 at regular time intervals, the frequency of which is governed by the first control technique. From these sampled measurements, the controller 60 constructs a rolling average of the power that is consumed by the load 50. For example, the controller 60 may measure the power that is consumed by the load 50 at five minute intervals. Other time intervals may be used. After measuring the power at each time interval, the controller 60 determines (block 174) a new rolling average for the power that is consumed by the load 50. If the controller 60 subsequently determines (diamond 176) that the rolling average of the power is above an upper threshold, then the controller 60 sets (block 178) a flag indicating the continued increase and controls the fuel processor 22 accordingly. As an example, the upper threshold may represent a predetermined percentage increase from a level of the power averaged over the last several time intervals, for example. Other techniques may be used to set the threshold. Alternatively, the rolling average itself may be used to control the output of the fuel processor 22 without comparing this average to a threshold before taking action with the fuel processor 22. Other variations are possible.

Therefore, due to this technique, increases in the power (that is consumed by the load 50) that are relatively short in duration do not effect the rolling average. However, sustained increases in the power increase the rolling average and thus, provoke a change in the output of the fuel processor 22.

Figure 8:
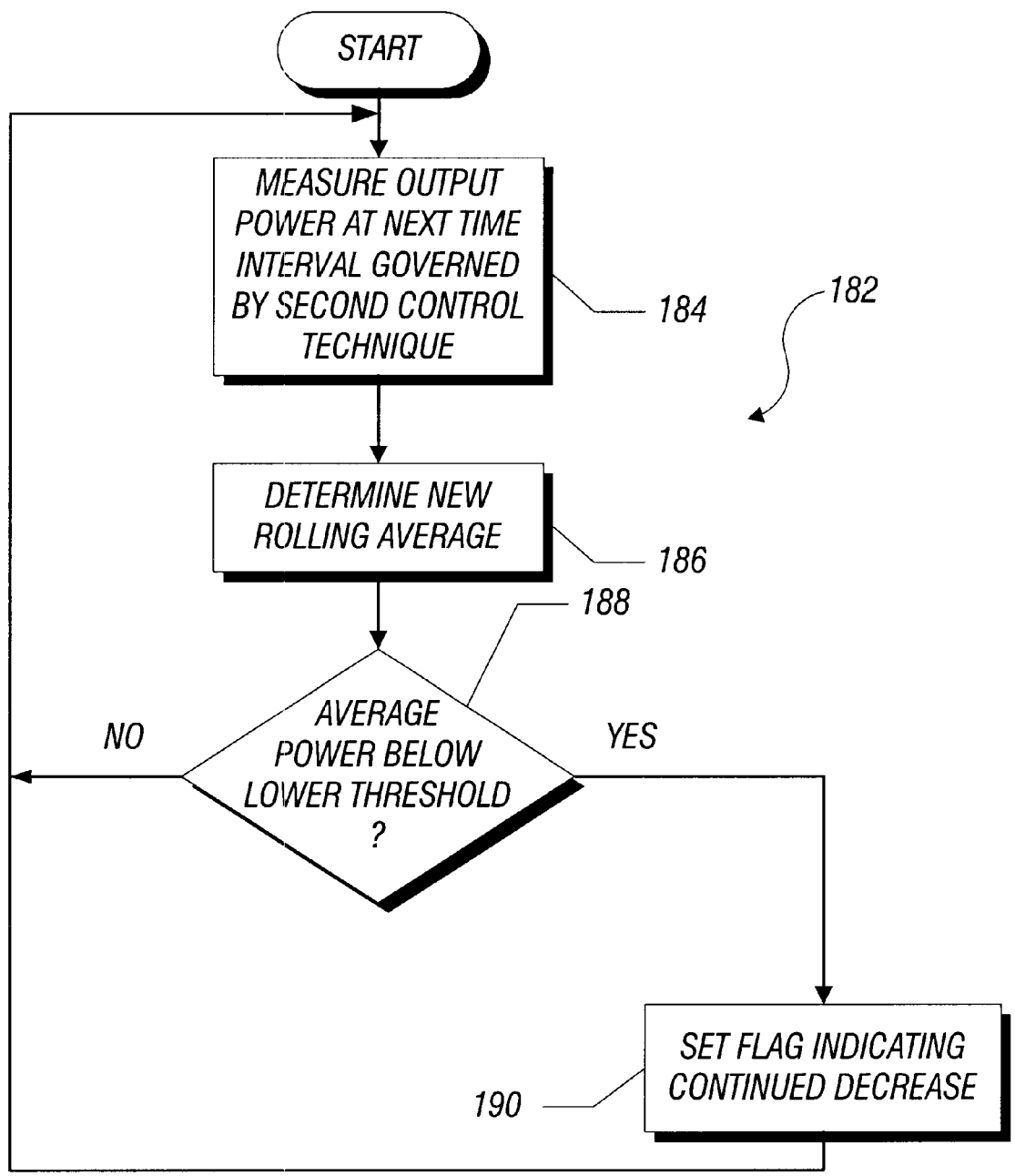

Referring to FIG. 8, in a similar manner, the controller 60 may perform a rolling average technique 182 to address decreases in the power that is consumed by the load 50. The controller 60 may perform the technique 182 when executing the program 65.

In the technique 182, the controller measures (block 184) the power that is consumed by the load 50 at the next regular time interval. The timing of the time intervals (i.e., the frequency at which measurements of the power that is consumed by the load 50 are taken) is governed by the second control technique. After each measurement, the controller 60 uses the measurement to determine (block 186) the new rolling average.

In some embodiments of the invention, the controller 60 takes the measurements that are used for determining the rolling average that is associated with the second control technique at a higher frequency than the measurements that are used for determining the rolling average that is associated with the first control technique. This difference allows the controller 60 to respond more rapidly to decreases in the power that is consumed by the load 50 than to increases in the power that is consumed by the load 50.

Continuing the description of the technique 182, if the controller 60 determines (block 188) that the average power is below a lower threshold, then the controller 60 sets (block 190) a flag indicating the continued decrease and proceeds as described above to control the fuel processor 22 to respond to the sustained decrease in the power that is consumed by the load 50. Alternatively, the rolling average itself may be used to control the output of the fuel processor 22 without comparing this average to a threshold before taking action with the fuel processor. Other variations are possible.

Thus, the controller 60 may use a first rolling average in connection with the first control technique to respond to up transients and a second rolling average in connection with the second control technique to respond to down transients.

Instead of using rolling averages to establish the first and second delay intervals, in some embodiments of the invention, the controller 60 may measure a delay interval that has a constant, or fixed, duration. In this manner, the controller 60 may introduce a fixed delay interval that is shorter in duration for responding to sustained decreases in the power that is demanded by the load 50 and introduce a fixed delay interval that is longer in duration for responding to sustained increases in the power that is demanded by the load 50.

Figure 9:
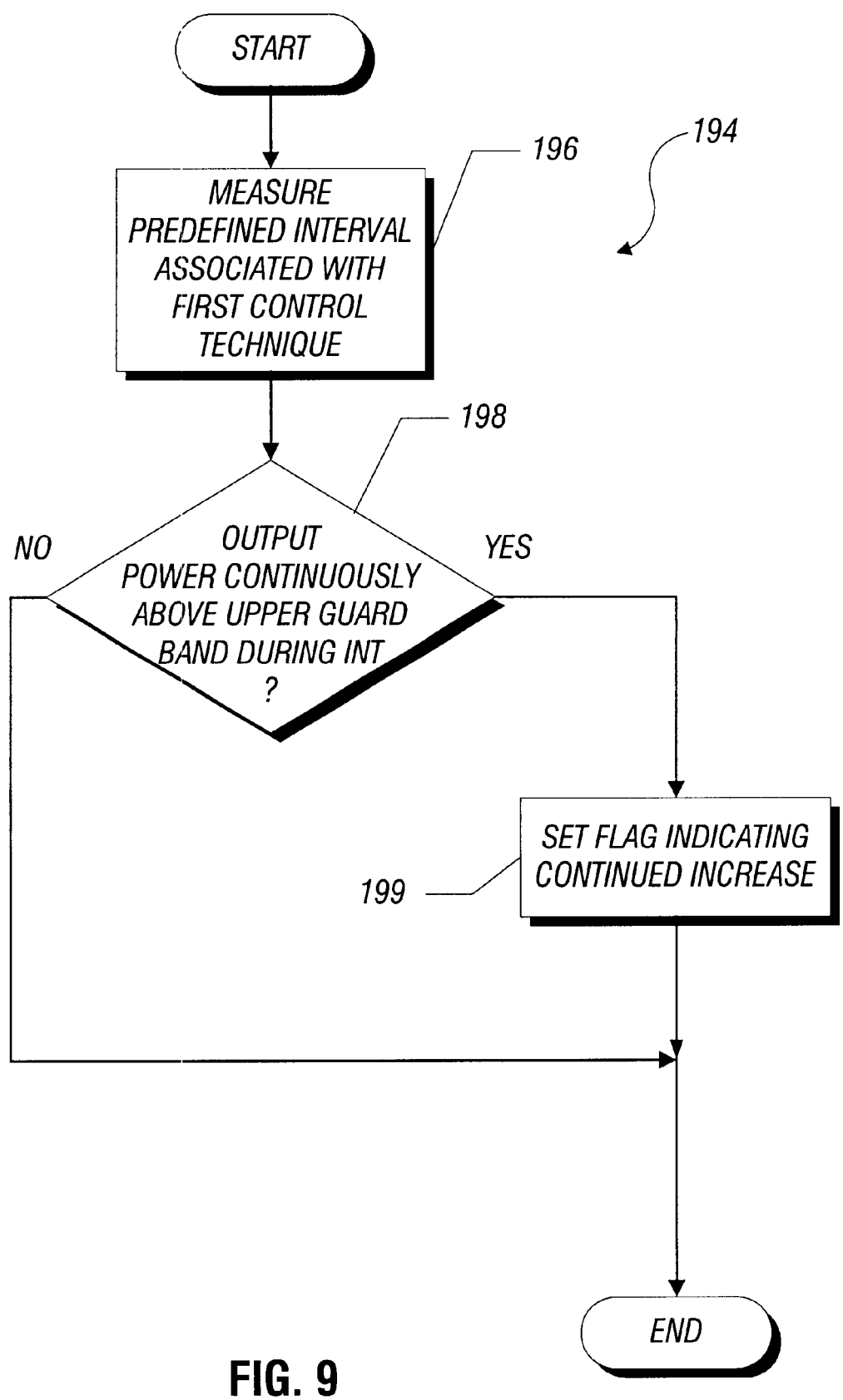

More specifically, referring to FIG. 9, the controller 60 may perform a technique 194 (when executing the program 65) to control the fuel processor 22 in response to an up transient using a delay interval that has a fixed duration. In the technique 194, the controller 60 measures (block 196) a predefined interval (i.e., the first delay interval that is associated with the first control technique) when the controller 60 determines that an up transient has occurred. If the controller 60 subsequently determines (diamond 198) that the increase in the power that is consumed by the load has been sustained during this time interval, then the controller 60 sets (block 199) a flag that indicates the continued increase and thereafter, controls the fuel processor 22 accordingly to increase its output to produce the appropriate level of power for the load 50.

Figure 10:
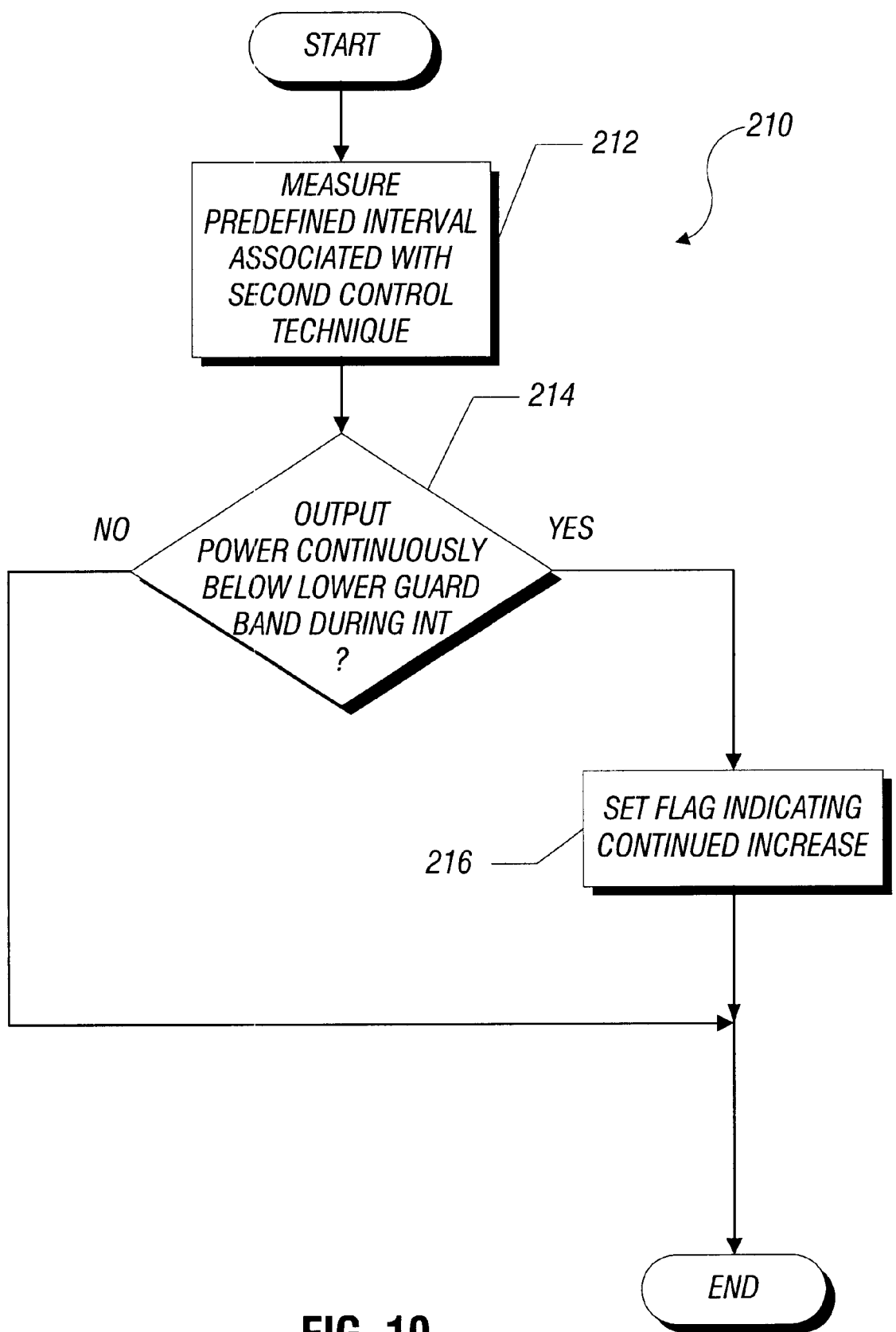

Referring to FIG. 10, similar to the above-described technique 194 to control the fuel processor 22 in response to up transients, the controller 60 may use a technique 210 (when executing the program 65) that uses a fixed duration delay interval (i.e., the second delay used by the second control technique) in response to the controller 60 detecting a down transient. The duration of this delay interval may be less than the duration of the delay interval that is used in the technique 194.

In the technique 210, the controller 60 begins measuring (block 212) a predefined delay interval (that is associated with the second control technique) in response to a down transient. If the controller 60 determines (diamond 214) that a decrease in the power has been sustained, then the controller 60 sets (block 216) a flag indicating the continued decrease and decreases the output of the fuel processor 22 accordingly.

Referring back to FIG. 1, among the other features of the fuel cell system 20, the system 20 may include a voltage regulator 30 that regulates the $V_{TERM}$ stack voltage and converts this voltage into an AC voltage via an inverter 33. The output terminals 32 of the inverter 33 are coupled to the load 50. The fuel cell system 10 also includes control valves 44 that provide emergency shutoff of the oxidant and fuel flows to the fuel cell stack 20. The control valves 44 are coupled between inlet fuel 37 and oxidant 39 lines and the fuel and oxidant manifold inlets, respectively, to the fuel cell stack 20. The inlet fuel line 37 receives the fuel flow from the fuel processor 22, and the inlet oxidant line 39 receives the oxidant flow from the air blower 24. The fuel processor 22 receives a hydrocarbon (natural gas or propane, as examples) and converts this hydrocarbon into the fuel flow (a hydrogen flow, for example) that is provided to the fuel cell stack 20.

The fuel cell system 10 may include water separators, such as water separators 34 and 36, to recover water from the outlet and/or inlet fuel and oxidant ports of the stack 22. The water that is collected by the water separators 34 and 36 may be routed to a water tank (not shown) of a coolant subsystem 54 of the fuel cell system 10. The coolant subsystem 54 circulates a coolant (de-ionized water, for example) through the fuel cell stack 20 to regulate the operating temperature of the stack 20. The fuel cell system 10 may also include an oxidizer 38 to burn any fuel from the stack 22 that is not consumed in the fuel cell reactions.

For purposes of isolating the load from the fuel cell stack 20 during a shut down of the fuel cell system 10, the system 10 may include a switch 29 (a relay circuit, for example) that is coupled between the main output terminal 31 of the stack 20 and an input terminal of the current sensing element 49. The controller 60 may control the switch 29 via an electrical communication line 50.

In some embodiments of the invention, the controller 60 may include a microcontroller and/or a microprocessor to perform one or more of the techniques that are described herein when executing the program 65. For example, the controller 60 may include a microcontroller that includes a read only memory (ROM) that serves as the memory 63 and a storage medium to store instructions for the program 65. Other types of storage mediums may be used to store instructions of the program 65. Various analog and digital external pins of the microcontroller may be used to establish communication over the electrical communication lines 46, 51 and 52 and the serial bus 48. In other embodiments of the invention, a memory that is fabricated on a separate die from the microcontroller may be used as the memory 63 and store instructions for the program 65. Other variations are possible.

In the connection mode in which the fuel cell system 10 is connected in parallel to the power grid 56, the controller 60 may activate the switches 58 and 57 (part of a relay circuit, for example) to couple the fuel cell system 10 to the power grid 56. Thus, due to this connection, when the fuel cell system 10 does not provide all of the power that is consumed by the load 50, the power grid 56 supplies the additional power to the load 50. In some embodiments of the invention, the fuel cell system 10 may provide power to the power grid 56 when the fuel cell system 10 provides more power than is consumed by the load 50.

In the connection mode in which the fuel cell system 10 is not connected in parallel with the power grid 56, the controller 60 may open the switches 57 and 58 to disconnect the power grid 56 from the fuel cell system 10. In the case that the fuel cell stack 20 does not supply adequate power to the load 50, the batteries 41 may supplement the power that is provided by the fuel cell stack 20. In this mode, the controller 60 closes a switch 45 to couple the battery 41 to the remainder of the fuel cell system 10. When the switch 45 is closed, the output terminal of the battery 41 is coupled to the anode of a diode 43 that has its cathode coupled to the output terminal 31 of the fuel cell stack 20. Another diode 11 has its anode coupled to the output terminal 31 and its cathode coupled to the cathode of the diode 42. Thus, when the $V_{TERM}$ terminal voltage of the fuel cell stack 20 drops below a predefined threshold, the diode 43 conducts, thereby allowing the battery 41 to provide additional power to supplement the power that is provided by the fuel cell stack 20.

Other embodiments are within the scope of the appended claims. For example, in some embodiments of the invention, the second control technique may include not introducing any delays when responding to down transients. Thus, in this manner, for these embodiments the controller may immediately respond to a down transient. The controller 60 may, however, place a limit on the rate at which the fuel flow may decrease, as described above. Other variations are possible.

While the invention has been disclosed with respect to a limited number of embodiments, those skilled in the art, having the benefit of this disclosure, will appreciate numerous modifications and variations therefrom. It is intended that the appended claims cover all such modifications and variations as fall within the true spirit and scope of the invention.

What is claimed is:

1. A method usable with a fuel cell stack, comprising:
    coupling the fuel cell stack to a load;
    monitoring a power consumed by the load;
    determining if the power is increasing or decreasing;
    if the power is increasing, using a first control technique to control a fuel flow to the fuel cell stack; and
    if the power is decreasing, using a second control technique different from the first control technique to control the fuel flow to the stack.

2. The method of claim 1, wherein the act of using the first control technique comprises:
    introducing a first delay, and
    responding to the expiration of the first delay by increasing the fuel flow to the stack.

3. The method of claim 2, wherein the first delay has a variable duration.

4. The method of claim 2, wherein the first delay has a constant duration.

5. The method of claim 2, wherein the act of introducing the first delay comprises:
    determining a rolling average of the power that is consumed by the load.

6. The method of claim 2, wherein the act of using the second control technique comprises:
    introducing a second delay; and
    responding to the expiration of the second delay by decreasing the fuel flow to the stack, the second delay being different than the first delay.

7. The method of claim 1, wherein the act of using the second control technique comprises:
    immediately responding to the decrease in the power to decrease the fuel flow to the stack.

8. The method of claim 7, further comprising:
    limiting a rate at which the fuel flow to the stack decreases.

9. The method of claim 1, wherein the act of using the second control technique comprises:
    introducing a delay, and
    responding to the expiration of the delay by decreasing the fuel flow to the stack.

10. The method of claim 9, wherein the delay has a variable duration.

11. The method of claim 9, wherein the delay has a constant duration.

12. The method of claim 9, wherein the act of introducing the delay comprises:
   determining a rolling average of the power that is consumed by the load.

13. The method of claim 1, wherein the act of using the second control technique comprises:
   immediately responding to the decrease in the power to decrease the fuel flow to the stack.

14. The method of claim 13, further comprising:
   limiting a rate at which the fuel flow to the stack decreases.

15. A system comprising:
   a fuel processor to provide a fuel flow;
   a fuel cell stack to provide a first power to a load in response to the fuel flow;
   a circuit to measure a second power being consumed by the load; and
   a controller coupled to the circuit and the fuel processor to:
      determine if the second power is increasing or decreasing,
      if the second power is increasing, use a first control technique to control a fuel flow to the fuel cell stack, and
      if the second power is decreasing, use a second control technique different from the first control technique to control the fuel flow to the stack.

16. The system of claim 15, wherein the controller uses the first control technique by introducing a first delay and in response to the expiration of the first delay, increasing the fuel flow to the stack.

17. The system of claim 16, wherein the first delay has a variable duration.

18. The system of claim 16, wherein the first delay has a constant duration.

19. The system of claim 16, wherein the controller determines a rolling average of the second power that is consumed by the load to introduce the first delay.

20. The system of claim 16, wherein the controller uses the second control technique by introducing a second delay and responding to the expiration of the second delay by decreasing the fuel flow to the stack, the second delay being different than the first delay.

21. The system of claim 16, wherein the controller uses the second control technique by immediately responding to the decrease in the second power to decrease the fuel flow to the stack.

22. The system of claim 21, wherein the controller limits a rate at which the fuel flow to the stack decreases.

23. The system of claim 15, wherein the controller uses the second control technique by introducing a delay and responding to the expiration of the delay by decreasing the fuel flow to the stack.

24. The system of claim 23, wherein the delay has a variable duration.

25. The system of claim 23, wherein the delay has a constant duration.

26. The system of claim 23, wherein the controller determines a rolling average of the second power that is consumed by the load to introduce the delay.

27. The system of claim 21, wherein the controller uses the second control technique by immediately responding to the decrease in the second power to decrease the fuel flow to the stack.

28. The system of claim 27, wherein the controller limits a rate at which the fuel flow to the stack decreases.

* * * * *